Figure 1:
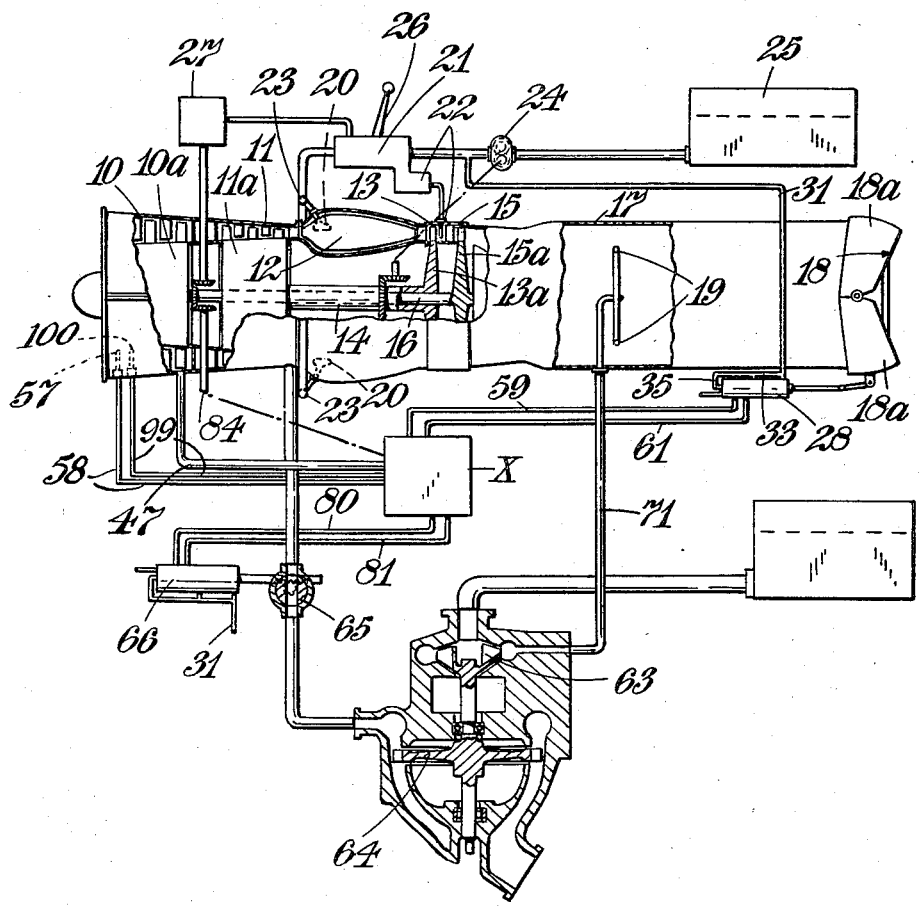

April 26, 1960  D. O. DAVIES  2,933,887
COMPOUND GAS TURBINE ENGINE WITH CONTROL FOR LOW-PRESSURE ROTOR
Filed July 2, 1954  5 Sheets-Sheet 1

April 26, 1960
D. O. DAVIES
2,933,887
COMPOUND GAS TURBINE ENGINE WITH CONTROL FOR LOW-PRESSURE ROTOR
Filed July 2, 1954
5 Sheets-Sheet 4
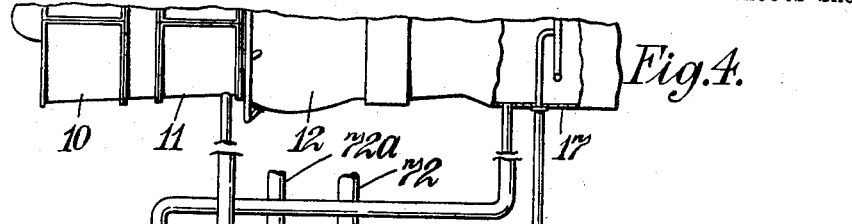
Fig.4.
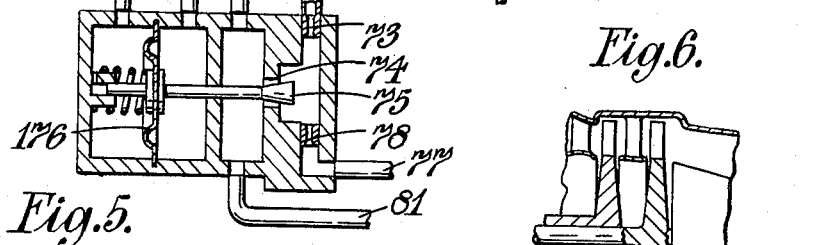
Fig.5.   Fig.6.
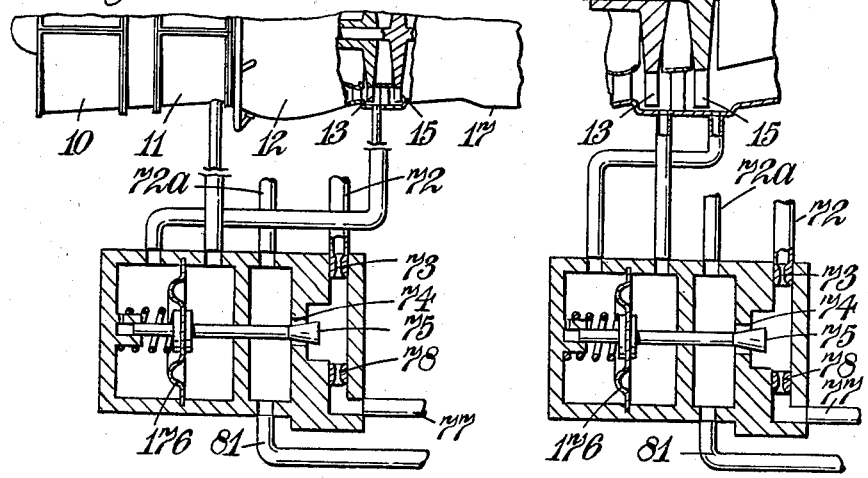
Fig.7.
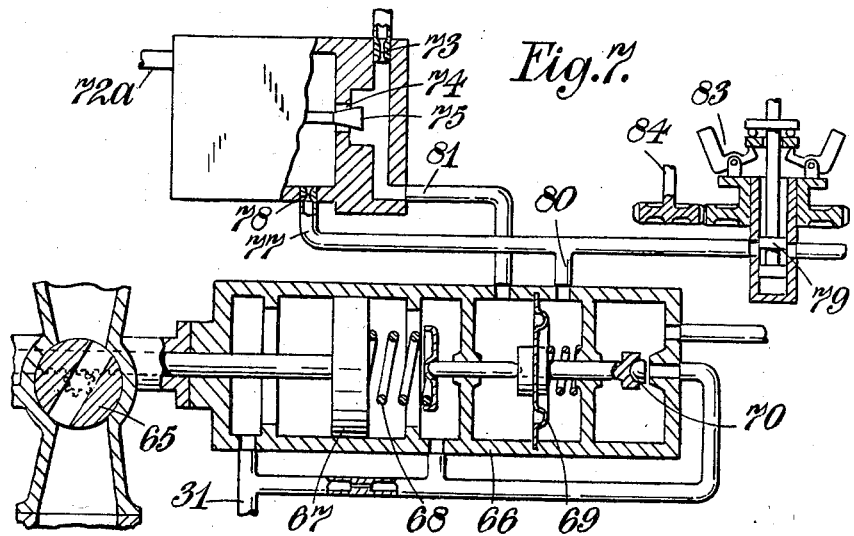

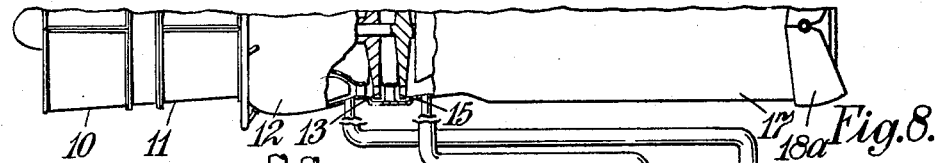
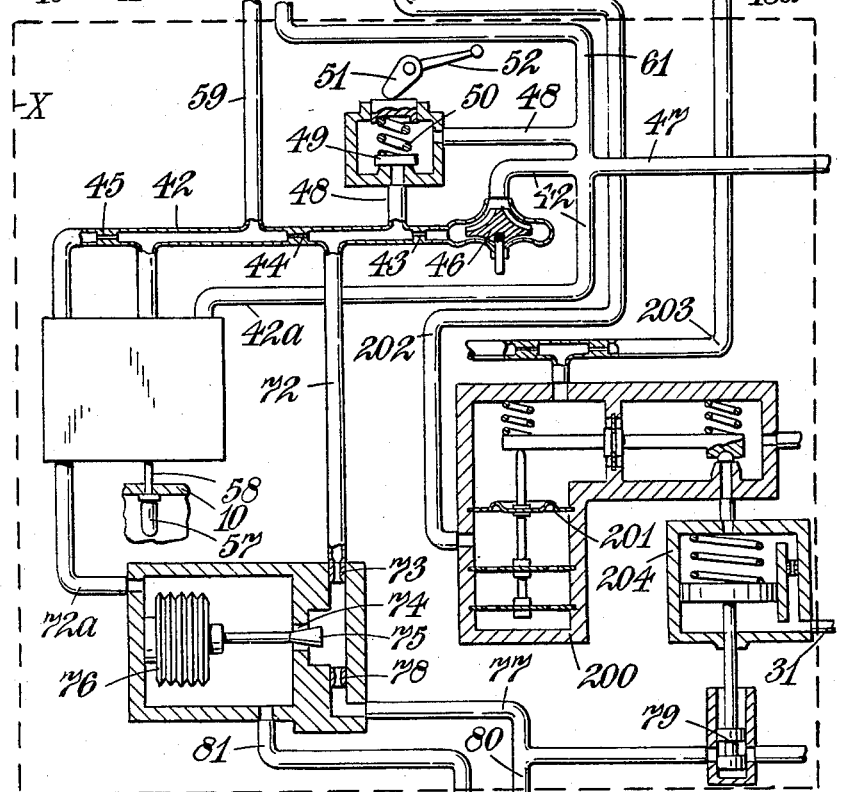
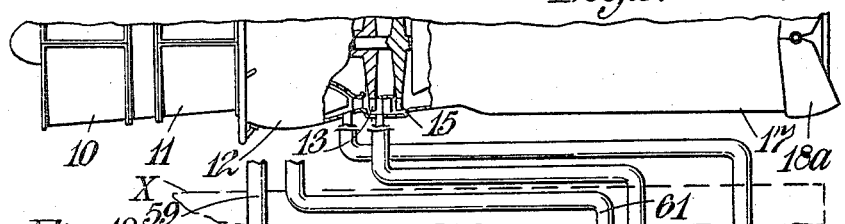
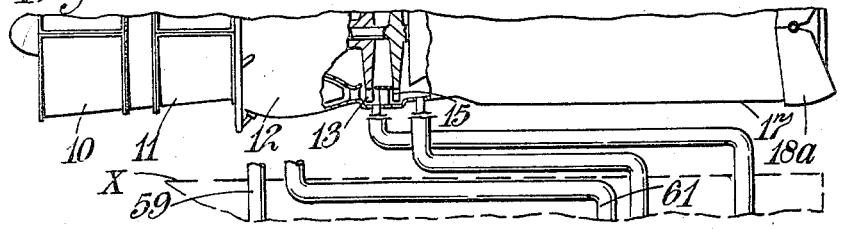

United States Patent Office 2,933,887
Patented Apr. 26, 1960

2,933,887

COMPOUND GAS TURBINE ENGINE WITH CONTROL FOR LOW-PRESSURE ROTOR

David Omri Davies, Kingsway, Derby, England, assignor to Rolls-Royce Limited, Derby, England, a British company Application July 2, 1954, Serial No. 441,113

Claims priority, application Great Britain July 16, 1953

8 Claims. (Cl. 60—35.6)

This invention relates to gas-turbine engines of the compound type, that is engines of the type having a low-pressure compressor and a high-pressure compressor, the rotors of the compressors being driven independently by a low-pressure turbine and by a high-pressure turbine respectively. The low-pressure compressor delivers air to the high-pressure compressor, and the low-pressure turbine is driven by gases exhausting from the high-pressure turbine. The rotors of the low-pressure compressor and of the low-pressure turbine will be referred to collectively as the "low-pressure rotor," and similarly the rotors of the high-pressure compressor and turbine will be referred to as the "high-pressure rotor."

An intermediate-pressure compressor may be provided between the low-pressure and high-pressure compressors, the intermediate-pressure compressor being driven by a turbine connected between the high-pressure and low-pressure turbines.

A gas-turbine engine of the compound type also comprises main combustion equipment receiving compressed air from the high-pressure compressor and delivering the gases resulting from the burning of fuel therein to the high-pressure turbine, and, when the engine exhaust gases are employed to produce a propulsive jet, may also comprise reheat combustion equipment downstream of the low-pressure turbine whereby fuel is delivered to be burnt in a jet pipe conveying exhaust gases from the turbines to a propelling nozzle through which the gases pass to atmosphere as a propulsive jet.

This invention relates more specifically to gas-turbine engines of the compound type arranged to produce a propulsive jet and having both main and reheat combustion equipment, and has for an object to provide an improved control for the engine.

According to the present invention, in a gas-turbine engine of the compound type arranged for jet propulsion and having both main combustion equipment and reheat combustion equipment, there is provided control means operative to vary the fuel delivery to the reheat combustion equipment so as to control the speed of the low-pressure rotor in a desired manner.

Preferably, the control means is operative to vary the fuel delivery to the reheat combustion equipment in a manner to maintain constant the corrected rotational speed of the low-pressure rotor, that is to maintain constant $$\frac{N}{\sqrt{T_1}}$$

where N is the actual rotational speed of the low-pressure rotor and $T_1$ is the absolute temperature at the entry to the compressor.

Alternatively, the control means is arranged to vary the fuel supply to the reheat combustion equipment so as to maintain a selected pressure ratio across the low-pressure turbine section or the high-pressure turbine section or across both turbine sections.

In one arrangement according to the present invention, the control means includes means to select a basic rate of fuel supply to the reheat combustion equipment and means to adjust the basic fuel supply in accordance with the actual or corrected rotational speed of the low-pressure rotor or turbine pressure ratio. For instance, the jet pipe may be provided with a variable-area jet nozzle and adjusting means for the nozzle by which the area may be selected to have any value between minimum and maximum values and the control means may be arranged so that, on selection of the area of the nozzle, a corresponding basic fuel supply to the reheat combustion equipment is selected which basic supply is adjusted to achieve the desired control. In such an arrangement, the pilot may select a "degree of reheat" and the control may be such that the area to which the nozzle is adjusted depends on the selected degree of reheat and the absolute temperature ($T_1$) at the entry to the engine compressor; for instance it may be arranged that below a first selected value of the temperature ($T_1$) and above a second and high value, the area depends on the selected degree of reheat alone, but that between these temperatures, the set nozzle area increases with increase of the temperature ($T_1$).

There will now be described some arrangements of control according to this invention, reference being made in the description to the accompanying drawings in which—

Figure 2:
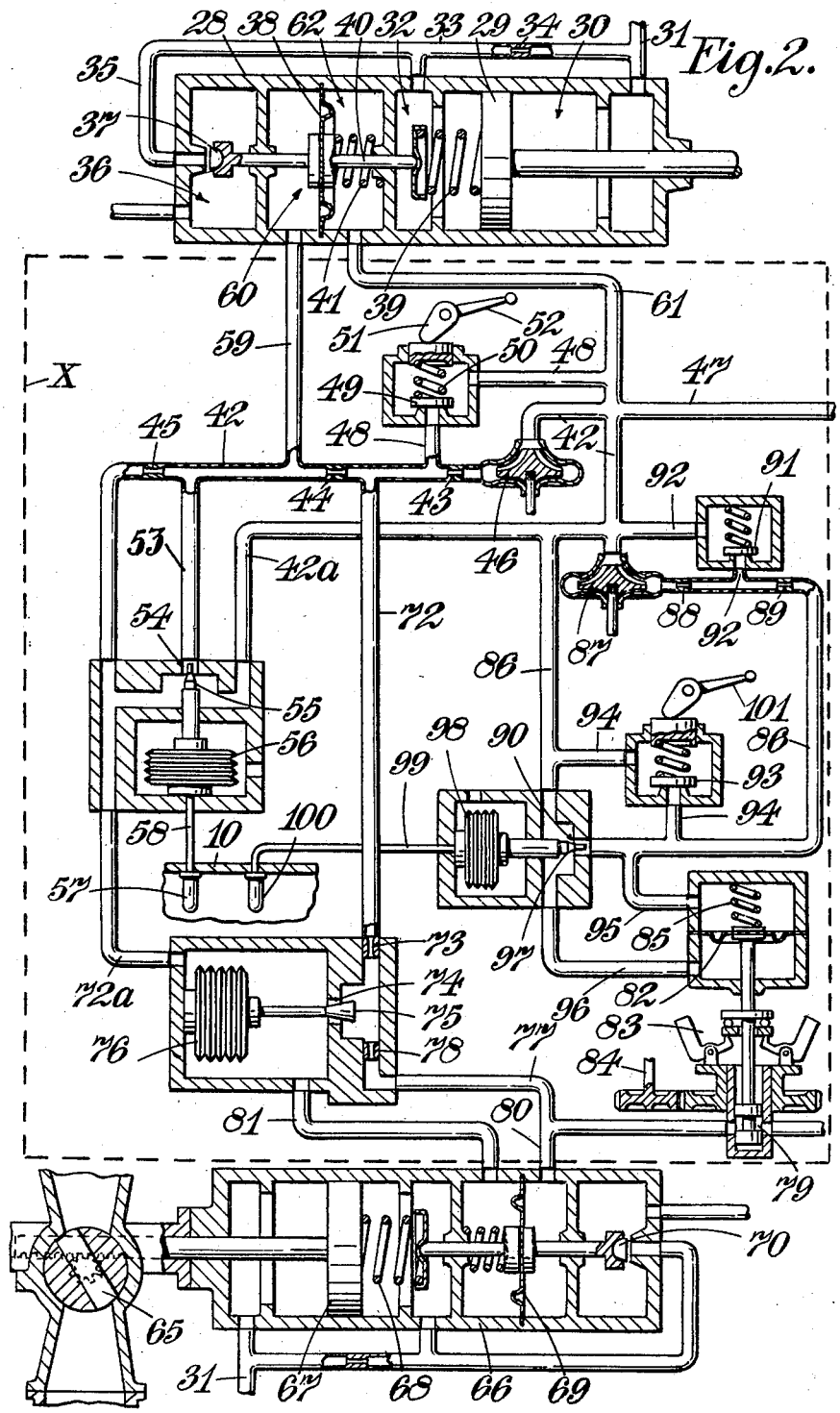
Figure 3:
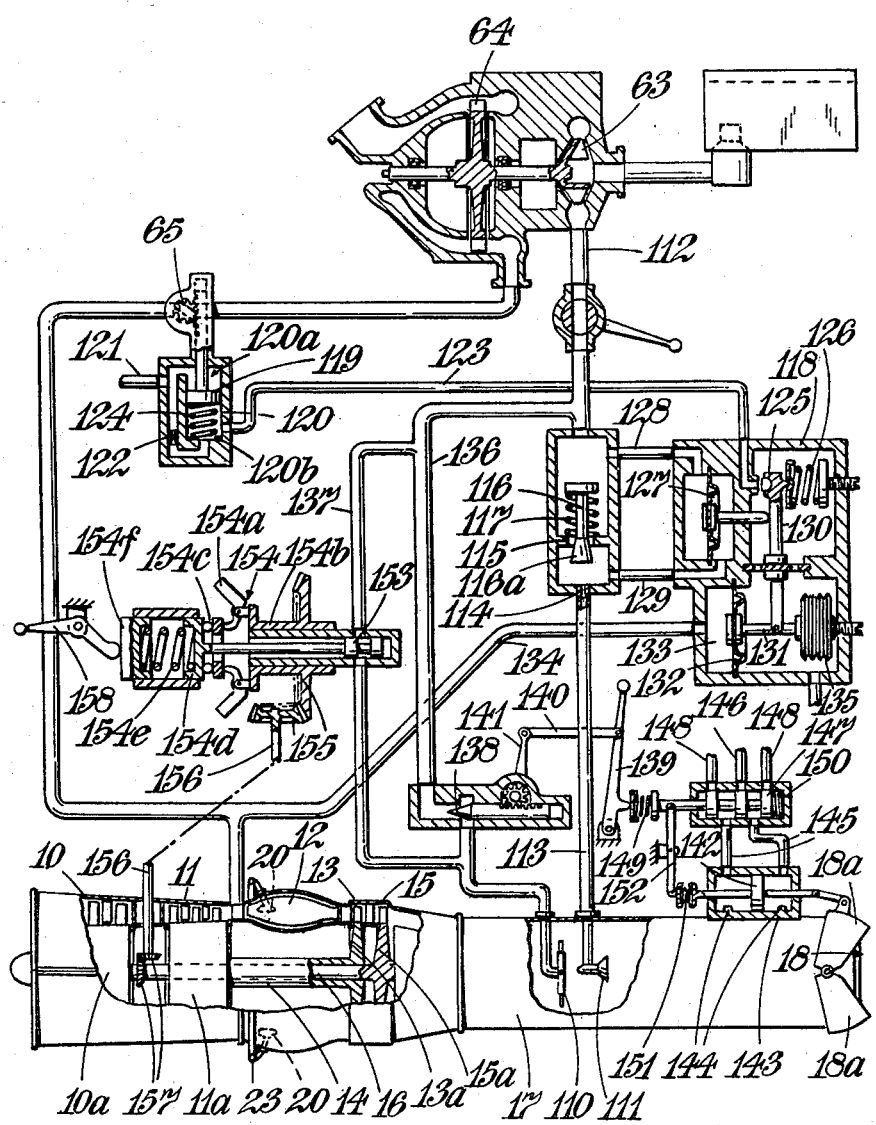

Figure 1 illustrates a gas-turbine engine of the compound type arranged for jet propulsion and having reheat combustion equipment for increasing the propulsive thrust developed by the engine under certain conditions of operation, Figure 2 illustrates parts of Figure 1 in more detail, Figure 3 illustrates a second form of the invention, Figures 4, 5, 6 and 7 show alternative arrangements for parts of the control shown in Figure 2, Figure 8 shows an alternative form for the control mechanism contained within dotted lines in Figure 2, and Figures 9 and 10 show alternative connections for parts of the control shown in Figure 8.

Referring to Figure 1, the engine comprises a low-pressure compressor 10, a high-pressure compressor 11 which is connected with the delivery of the low-pressure compressor 10 so as to receive compressed air therefrom, and main combustion equipment 12 which is connected to receive compressed air from the high-pressure compressor 11 and which has fuel delivered into it to be burnt with the air. The engine also comprises a high-pressure turbine 13 whereof the rotor 13a is drivingly connected by a hollow shaft 14 to the rotor 11a of the high-pressure compressor 11 to drive it, and an independently-rotating low-pressure turbine 15 whereof the rotor 15a is drivingly connected by a shaft 16 to the rotor 10a of the low-pressure compressor 10. The turbines 13, 15 are connected with the main combustion equipment 12 to receive the gaseous products of combustion from it, the products of combustion passing first through the high-pressure turbine 13 and then through the low-pressure turbine 15. The engine also comprises an exhaust assembly including a jet pipe 17 receiving the exhaust gases from the low-pressure turbine 15, and a variable-area propulsion nozzle 18 at the outlet end of the jet pipe 17 through which the exhaust gases pass to atmosphere as a propulsive jet. The engine also comprises reheat combustion equipment which comprises fuel injector means 19 to deliver fuel into the jet pipe to be burnt therein.

Under normal conditions of operation, the reheat combustion equipment is inoperative and fuel is supplied to the main combustion equipment 12 only, the supply being through injectors 20 which are connected to a manifold 23 fed with pressure fuel by a pump 24 drawing fuel from a tank 25. The rate of supply of fuel is controlled by a lever 26 and a control mechanism 21 including a temperature-responsive control 22. When operating under these conditions the variable-area propelling nozzle 18 is normally adjusted to its minimum area position. Under these conditions, in the lower speed range, the speed of the high-pressure rotor assembly 11a, 13a is controlled by varying the fuel flow to the main combustion equipment 12 through the main control mechanism 21; in the top speed range, the speed of the high-pressure rotor assembly is controlled by varying the fuel flow to the main combustion equipment through the temperature-responsive control 22, in such a manner as to prevent a selected temperature at a point between the turbine rotors 13a, 15a being exceeded. These controls may be of any known or convenient form. Under these conditions the rotational speed of the low-pressure rotor assembly is automatically determined but a maximum speed governor or cut-out 27 will normally be provided to prevent overspeeding.

During operation of the engine with fuel being supplied to the reheat combustion equipment 19, the variable-area nozzle 18 is opened up from the minimum area, and the high-pressure rotor assembly 11a, 13a is controlled by varying the supply of fuel to the main combustion equipment 12 in a manner to maintain a selected temperature at the exit from the high-pressure turbine 13.

When operating under these conditions it is arranged in accordance with the present invention, that the speed of the low-pressure rotor assembly 10a, 15a is controlled by variation of the quantity of fuel delivered to the reheat combustion equipment 19.

In the following particular arrangement the pilot is given a control by means of which he selects any "degree of reheat" up to a maximum value and it is arranged that the variable-area nozzle is adjusted by the selection of the degree of reheat to have a corresponding effective area.

The propelling nozzle for example comprises adjustable nozzle segments 18a and a ram 28 to adjust the nozzle segments, the ram being arranged so that the ram piston may be set at any desired position between the ends of its travel.

In one arrangement (Figures 1 and 2) the ram piston 29 has one end surface larger than the other and the ram piston divides the ram cylinder 28 into two spaces. The cylinder space 30 having the smaller-area end of the ram piston 29 as part of its wall is directly connected through a pipe 31 to a source of pressure fuel or pressure air (indicated in Figure 1 as the delivery of pump 24) and the cylinder space 32 having the other end of the piston as part of its wall is connected by a pipe 33 to the same source but through a restrictor 34 in the pipe. A bleed passage 35 is provided from the cylinder space 32 to a low-pressure point indicated by space 36 and a bleed control valve 37 is provided at the outlet of the passage 35 to determine the rate of flow through the passage.

The bleed valve 37 is arranged to be loaded in the sense of closure in accordance with the position of the ram piston 29 between the limits of its travel and also in the sense of opening in accordance with the selected degree of reheat, and as a result the ram piston will take up a single specific position for each selected degree of reheat.

The bleed valve 37 may, as shown, be connected to a flexible diaphragm 38 which is loaded in the sense of opening the valve element 37 by a fluid pressure which depends on the selected degree of reheat and is loaded in the sense of closure by a spring 39 which has one abutment on the diaphragm 38 through a push rod 40 and a second abutment on the ram piston 29. The diaphragm 38 may also be loaded in the sense of closing the valve element by a second spring 41 having one abutment on the diaphragm 38 and a second abutment which is fixed.

It will conveniently be arranged that as the fluid load on the diaphragm 38 increases and thus the ram piston 29 moves so that the spring load due to spring 39 increases, the nozzle segments 18a are adjusted to increase the effective area of the nozzle 18.

The fluid pressure in accordance with the selected degree of reheat is, in the control illustrated in Figures 1 and 2, derived in the following manner. A source of high-pressure air or fuel is connected to deliver into a main conduit 42 having connected in it in series a first flow restrictor 43, a second flow restrictor 44 and a third flow restrictor 45, the downstream end 42a of the conduit being connected to a low-pressure point indicated by conduit 47 which, for example, if the high-pressure source is the delivery of the high pressure compressor 11, may be the outlet end of the low-pressure compressor 10, or if, as illustrated, the source of compressed air is provided by an independent compressor 46, may be the outlet or the inlet of the low-pressure compressor 10 or the outlet of the high-pressure compressor 11. There is provided a first branch conduit 48 leading from the main conduit 42 between the first and second restrictors 43, 44 to the low-pressure end thereof 42a and having in it a relief valve 49 which is loaded by a spring 50. The load of the spring 50 is variable by the pilot to select the degree of reheat, and may be varied for instance (as shown) by a cam 51 controlled by an operating arm 52, or by a swinging-spring or by electrical means. There is also provided a second branch conduit 53 from between the second and third restrictors 44, 45 to the low-pressure end 42a of the main conduit 42, and this second branch conduit contains a variable-area orifice 54 the effective area of which is adjusted by a valve member 55 in accordance with the temperature ($T_1$) at the entry to the low-pressure compressor 10 of the engine. The valve member 55 is carried by a capsule 56 connected to a bulb 57 located in the intake of the compressor 10, the bulb 57, capsule 56, and connecting pipe 58 being filled with a suitable liquid. Thus on change of temperature the liquid expands or contracts and the valve 55 is displaced accordingly. By suitably shaping the valve 55, it is arranged that as the temperature ($T_1$) increases up to a first selected value, the effective area of the orifice remains unchanged, that as the temperature ($T_1$) increases from the first selected value to a second selected value, so the area of the orifice is gradually decreased and that as the temperature ($T_1$) increases beyond the second selected value the effective area again remains constant.

A first tapping conduit 59 is taken from the main conduit 42 at a point between the second and third restrictors 44, 45 to a chamber 60 on one side of the diaphragms 38, and a second tapping conduit 61 is taken from the low-pressure end 42a of the main conduit 42 to a chamber 62 on the opposite side of the diaphragm 38.

With the arrangement as described the effective area of the variable-area nozzle 18 will depend upon the selected degree of reheat and upon the temperature ($T_1$).

On adjustment of the control lever 52 by the pilot to select the degree of reheat, not only is the area of the nozzle 18 adjusted as just described but a fuel-scheduling control is also set to determine a basic flow of fuel for the reheat combustion equipment 19 which corresponds to the instantaneous area of the variable-area nozzle 18.

The means for obtaining the scheduled fuel supply may be as follows. Fuel may be supplied from a fuel tank to the reheat combustion equipment by a pump 63 (Figure 1) driven by an air turbine 64: the supply of operating air, say from the outlet of the high-pressure compressor 11, to the turbine 64 is controlled by an air throttle valve 65 which is controlled by a ram device 66 similar to the ram 28 described for adjusting the nozzle segments 18a, and it is arranged that when the ram piston 67 moves in a sense to increase the load due to its first spring 68 on the diaphragm 69 controlling its bleed valve 70, the air throttle valve 64 is opened so increasing the rotational speed of the air turbine 64 and the fuel delivery by the pump 63 through delivery pipe 71 to the reheat combustion equipment 19.

The pressure fluid for operating the ram may be taken from the same source as that for the ram 28, as is indicated by both supply pipe lines being referenced 31.

In this case the fluid load applied to the diaphragm 69 may be obtained in the following manner. A branch 72 may be connected to the main conduit 42 above referred to at a point between the first and second restrictors 43, 44 so as to obtain a pressure which is representative of the selected opening of the variable-area nozzle 18, i.e., the "degree of reheat" selected, and there may be provided in the branch a fixed orifice 73 and in series therewith a variable-area orifice 74, the downstream end 72a of the branch 72 being connected to the low-pressure end 42a of the main conduit 42. The variable-area orifice 74 is shown as being controlled by a needle valve element 75 which is adjusted in accordance with the air mass flow through the engine. For this purpose, for instance, the needle valve 75 may be connected with an evacuated expansible capsule 76 which is externally subject to the low pressure at the outlet end 72a of the branch 72, that is the low-pressure at the downstream end 42a of the main conduit 42 i.e., to the inlet pressure of the low-pressure compressor 10, the delivery pressure of the low-pressure compressor 10, or the delivery pressure of the high-pressure compressor 11 depending on where the conduit 47 is connected. It will be appreciated that, at a given rotational speed, each of these pressures is, to a sufficient approximation, proportional to the engine mass flow. Alternatively the capsule 76 may be replaced by a diaphragm 176 subjected for example to the difference between the pressure at the delivery of the high-pressure compressor 11 and the pressure within the jet pipe 17 (as shown in Figure 4), or to the difference between the high-pressure compressor delivery pressure and the pressure between the high-pressure and low-pressure turbines 13, 15 (as shown in Figure 5), or to the pressure difference across the low-pressure turbine 15 (as shown in Figure 6), or to any pressure or difference in pressures which is approximately proportional to engine mass flow. The area of the variable-area orifice 74 is arranged to be decreased on increase of engine mass flow.

A sub branch conduit 77 is taken from the branch conduit 72 between the fixed orifice 73 and the variable-area orifice 74, and the sub-branch conduit 77 has connected in it in series a fixed orifice 78 and a bleed valve 79, which will be referred to as the governor bleed valve. A first pressure tapping 80 is taken from between the restrictor 78 and governor bleed valve 79 to one side of the diaphragm 69, and a second tapping 81 is taken from the other side of diaphragm 69 to the branch conduit 72a to be at the pressure at the downstream end 42a of the conduit 42. The pressure difference across these tappings is therefore (ignoring the effect of governor bleed valve 79) a function of the degree of reheat selected and the air mass flow of the engine. The governor bleed valve 79 is controlled in any convenient manner in accordance with the pressure ratio across either of the turbines 13, 15 or both of the turbines 13, 15 or in accordance with the corrected rotational speed $$\frac{N}{\sqrt{T_1}}$$

of the low-pressure compressor 10, and it is arranged that if the said ratio or the corrected rotational speed of the low-pressure compressor increases slightly above the desired value, the governor bleed valve 79 closes so increasing the fluid pressure difference on the diaphragm 69, causing the bleed valve 70 of ram 66 to open and allowing an increase in the fuel delivery beyond the scheduled value to the reheat combustion equipment 19 so reducing the pressure drop across the low-pressure turbine 15 and restoring the ratio or the speed to the desired value. If the ratio or the speed falls below the desired value, the governor bleed valve 79 opens so reducing the fluid pressure difference acting on the diaphragm 69 controlling the bleed valve of the ram 66 and thus moving the ram piston 67 to decrease the fuel supply to the reheat combustion equipment 19, so increasing the pressure drop across the low-pressure turbine 15 and restoring the ratio or speed to the desired value.

Alternatively as shown in Figure 7 it may be arranged so that when the rotational speed increases the governor bleed valve 79 opens, the ram piston 67 being connected to the air throttle valve 65 in the opposite sense so that in this case the reheat fuel flow is increased. Thus in this case the tapping 81 is taken from upstream of valve 75 and the tapping 77 with its restrictor 78 is taken from downstream of the valve 75.

The governor bleed valve 79 in the sub branch conduit 77 may for instance be controlled by being connected to a governor diaphragm 82 which is subjected to a load which is dependent upon the rotational speed of the low-pressure compressor and which is obtained in any known or convenient manner, for example, from a governor 83 driven by the low-pressure rotor assembly through a driving shaft 84 and which load acts on increase of speed to close the bleed valve 79 (in the example given above) against the load of a spring 85. The load dependent on the speed may alternatively be obtained as a fluid pressure load in known manner, for example by use of a gear pump driven by the low-pressure rotor. The governor diaphragm 82 is also loaded in opposition to the governor load by a fluid pressure load which varies as the temperature ($T_1$). This may be obtained from a fluid circuit comprising a source of high-pressure air or fuel indicated by a pump 87 and delivering into a main conduit 86 having in series in it three restrictors, of which the upstream restrictor 88 and intermediate restrictor 89 are fixed in area and the third 90 is variable in area in accordance with the temperature ($T_1$). There is a pressure relief valve 91 in a branch 92 from between the two fixed restrictors 88, 89 so as to maintain the pressure between them constant, and there is also a variable-load relief valve 93 in a by-pass conduit 94 connected at its ends to the main conduit 86 on each side of the variable area restrictor 90. Pressure tappings 95, 96 are taken from the main conduit 86 on each side of the variable-area restrictor 90 to each side of the diaphragm 82, so that the diaphragm 82 is subjected to a fluid pressure load which varies as the temperature ($T_1$) and which acts in the same sense as the spring load. This diaphragm will be referred to as the "temperature-controlled" diaphragm. By suitable choice of the dimensions of the parts, the governor bleed valve 79 in the sub branch conduit 77 can be made to control in accordance with corrected rotational speed.

The area of orifice 90 is varied by a valve element 97 carried by an expansible capsule 98 joined by a pipe 99 to a bulb 100 in the intake to the compressor 10, the bulb, pipe and capsule being filled with a suitable liquid.

As in the case of the temperature-controlled valve 54, 55 in the circuit providing the signal for the nozzle controlling ram 28, it is arranged that with the valve 90, 97 there is no change of area up to the first selected value of the temperature ($T_1$) and beyond the second selected value of the temperature ($T_1$) but that between the two values the area of the restrictor is decreased as the temperature ($T_1$) increases, so as gradually to increase the fluid loading on the temperature-controlled diaphragm 82 controlling the governor bleed valve 79 in the sub branch conduit 77 and thus increasing the governed speed.

The variable-load relief valve 93 acts to set a maximum value of the rotational speed N of the low-pressure compressor 10 and so acts as a safety device should the fuel supply control break down. By varying the loading of the relief valve in accordance with the setting of the pilot's control lever 101 a variation in the maximum rotational speed can be obtained which is in accordance with the selected degree of reheat. The levers 52 and 101 may be coupled together for simultaneous and similar operation.

Instead of obtaining a degree of reheat signal for use in controlling the fuel supply from the nozzle ram control circuit, the signal may be obtained from the nozzle 18 itself or from its operating ram 28.

It is preferred that the fluid employed in the control circuits be air so that air/liquid seals are not required, for example in the fuel scheduling control.

Referring now to Figures 8, 9 and 10, there is shown a control mechanism which is similar to that described with reference to Figure 2 except that the governor bleed valve 79 is adjusted by a pressure-responsive mechanism 200 responsive to the pressure drop across the two turbines 13, 15 (Figure 8), or across the high-pressure turbine (Figure 9) or across the low-pressure turbine (Figure 10). The pressure-responsive mechanism 200 is of known form and includes a diaphragm 201 loaded on one side through a tapping 202 to the low-pressure side of the turbine or turbines and loaded on the opposite side through a tapping 203 to the high-pressure side of the turbine or turbines. The diaphragm 201 controls a servo mechanism 204 connected to operate the governor bleed valve 79.

Referring now to Figure 3, there is illustrated a gas-turbine engine similar to that illustrated in Figure 1 except that instead of single fuel injector means 19 for the reheat combustion equipment, there are provided a pilot fuel injector 111 and main reheat fuel injectors 110.

In this construction the supply of fuel to the injectors 110 and 111 is from a centrifugal pump 63 driven by an air turbine 64 the supply of operating air to which is controlled by an air throttle valve 65 and in this respect the fuel system is the same as that described with reference to Figures 1 and 2.

The fuel supply to the pilot fuel injector 111 is controlled to be in a particular relationship to the delivery pressure of the high-pressure compressor 11 of the engine, and the supply of fuel to the main reheat fuel injectors 110 is controlled so as to be determined as the sum of two fuel flows, one of which flows is determined by the selected degree of reheat and the other of which flows is a correcting flow which is varied so as to maintain the rotational speed of the low-pressure compressor rotor 10a substantially constant.

The supply of fuel to the pilot fuel injector 111 is controlled as follows. The pilot fuel injector 111 is connected to the delivery pipe 112 of the pump 63 through a branch pipe 113 and the branch pipe 113 has fitted in it a restrictor 114 and a linear flow valve comprising an orifice 115, a valve element 116 with a shaped head 116a which co-operates with the orifice 115 and is shaped so that the flow through the orifice 115 tends to move the valve element 116 to increase the effective area of the orifice, and a spring 117 which urges the valve element 116 in a direction to tend to reduce the effective area of the orifice 115. The shape of the head 116a of the valve element 116 and the rate of the spring 117 are selected so that the pressure drop across the orifice 115 is directly proportional to the rate of fuel flow through it.

The pressure drop across the orifice 115 is employed as a control signal in a control mechanism 118 which is adapted to control the setting of the air throttle 65.

The air throttle 65 is actuated by a differential-area piston 119 working in a cylinder 120, the space 120a on the smaller-area side of the piston being connected through a pipe 121 directly to a source of pressure fluid and the space 120b on the other side of the piston being connected to the same source through a restrictor 122. The cylinder space 120b also has a vent pipe 123 leading to the control mechanism 118 which is adapted to control the bleed flow through the vent pipe 123. The piston 119 is loaded by a spring 124 which tends to urge it to a position in which the throttle valve 65 is fully open. It will be clear that the position of the piston 119 within the cylinder and thus the setting of the air throttle valve 65 will depend upon the rate of bleed flow through the vent pipe 123 and thus by controlling the rate of flow through the vent pipe 123, the speed of rotation of the air turbine 64 and of the fuel pump 63 may be controlled.

The outlet from the vent pipe 123 is controlled by a valve element 125 carried by a pivoted lever 130 which is urged:

(a) In the sense of opening of the valve by a load due to the pressure drop across orifice 115, applied to a diaphragm 127, one side of which is connected by a pressure connection 128 to upstream of the orifice 115 and the other side of which is connected by a pressure connection 129 to just downstream of the orifice 115, (b) In the sense of closure by a load dependent upon the absolute delivery pressure of the compressor 11. This load is applied to the lever 130 by a rod 131, one end of which is connected to a flexible diaphragm 132 forming a wall of a chamber 133 connected by a conduit 134 to the outlet of the compressor 11, and the other end of which is connected to an evacuated capsule 135 of the same effective area as the diaphragm 132, so that the load on the lever is directly proportional to the absolute delivery pressure of the compressor, and (c) In the sense of closure by a spring 126 which may be selected to balance the resilient load due to capsule 135.

It will be clear that since the load applied by diaphragm 127 which is directly proportional to the pilot fuel flow opposes the load due to the compressor delivery pressure, the bleed valve 125 will be adjusted to maintain the pilot fuel flow in a desired ratio to the compressor delivery pressure.

The main reheat fuel flow is conveyed from the delivery pipe 112 of the pump 63 to the injectors by a pair of branch pipes 136, 137 which are connected in parallel with one another.

The flow through the first branch pipe 136 is the basic fuel flow determined by the selected degree of reheat and is controlled by a throttle 138 the position of which is adjusted by a control lever 139 connected to the throttle valve 138 by a link 140 and an operating arm 141.

The control lever 139 also controls the setting of the nozzle segments 18a in any known or convenient manner so that they occupy a single specific position for each degree of reheat as selected by the position of lever 139. As illustrated, the nozzle segments 18a are connected to a piston 142 which works in a cylinder 143 between a pair of stops 144. Pressure fluid is supplied to the cylinder 143 through a pair of pipes 145 from a main supply pipe 146, the connection between the main supply pipe 146 and the pipes 145 being controlled by a piston valve 147 which also serves to control the connection of a pair of drain pipes 148 to the pipes 145. The piston valve is such that when one of the pipes 145 is connected to the main supply pipe 146, the other pipe 145 is connected to one of the drain pipes 148.

The position of the piston valve 147 is controlled from the lever 139 through a loading spring 149, an abutment for which is displaced by the lever 139, by a counterbalance spring 150 which acts on the piston 147 in the opposite direction to the spring 149, and by a spring load due to a spring 151 which is applied to the piston valve 147 through a pivoted lever 152, the load due to the spring 151 being dependent upon the position of the piston 142.

It will be seen that if, for example, the lever 139 is moved clockwise to compress spring 149, and the piston valve 147 is thus moved to the right, pressure fluid is conveyed from the main pipe line 146 to the left-hand pipe 145 and thus to the left-hand end of the cylinder 143, so that the piston 142 moves to the right, reducing the load on the piston valve 147 due to the spring 151 and allowing the spring 150 to move the piston valve 147 back towards its central position. Thus, for each position of the lever 139 which is selected, and the corresponding setting of throttle 138, the piston 142 will take up a corresponding position between its stops 144, and the final nozzle 18 will have a corresponding setting.

The flow through the second branch 137 is controlled by a valve 153 which is connected for operation to a governor 154 driven by the low-pressure rotor, the bob weights 154a being mounted on a carrier 154b which is rotatively driven by gearing 155 and shaft 156 and gearing 157 from the shaft 16. The bob weights 154a act through a thrust bearing 154c against a member 154d which is connected to the stem of the valve 153 and forms one abutment for the governor spring 154e. The governor has a second abutment 154f which is adjustable in position by a control lever 158. By adjusting the position of the abutment 154f and thus the load of the spring 154e on the abutment 154d, the rotational speed at which the low-pressure rotor is to be maintained can be selected.

On an unwanted increase in the rotational speed of the low-pressure rotor, the bob weights 154a displace the abutment 154d to the left so opening the valve 153 and increasing the flow of fuel to the main reheat fuel injectors 110. The increase of fuel causes an increase in the pressure within the jet pipe 17 and thus a decrease in the pressure drop across the turbines so that the rotational speed of the low-pressure rotor falls. Conversely, an unwanted decrease in the rotational speed of the low-pressure rotor causes the valve 153 to be closed and the supply of fuel to the main reheat fuel injectors 110 to be decreased, so that the pressure drop across the turbines increases and the rotational speed of the low-pressure rotor is restored to the desired value.

The fuel supply system for the main combustion equipment 12 is not indicated in the drawing and may be of any known and convenient form.

Instead of the delivery pressure of the high-pressure compressor 11, the pilot fuel flow may be maintained proportional to any other pressure or difference in pressures of the engine working fluid which is approximately or exactly proportional to the engine mass flow.

It will be appreciated that the proportionality need only be approximate in view of the fact that the final control on the reheat fuel flow is in accordance with the low-pressure rotor speed through valve 153.

I claim:

1. A compound pure-jet-propulsion gas-turbine engine having a low-pressure compressor, a high-pressure compressor, main combustion equipment, a high-pressure turbine and a low-pressure turbine disposed to receive the gas flow in series, the high-pressure turbine being drivingly connected to the high-pressure compressor and the low-pressure turbine being drivingly connected to the low-pressure compressor and rotatable independently of the high-pressure turbine; reheat combustion equipment in series flow arrangement downstream of said low-pressure turbine; a variable-area jet nozzle in series flow arrangement downstream of said reheat combustion equipment; a reheat fuel injector in said reheat fuel combustion equipment; a reheat fuel pump; a pipe connecting the delivery of said pump to said fuel injector; valve means adjustable to control the rate of fuel delivery from said reheat fuel pump to said fuel injector; and control means for adjusting of the valve means including pressure-responsive means connected to control adjustment of the valve means, a pressure fluid system having first and second pressure points, the fluid pressure at said first point differing from the pressure at said second point by a selected basic value, a first conduit, a fixed restrictor and a variable restrictor in flow series in said first conduit, said first pressure point being connected to said first conduit upstream of said fixed restrictor, said pressure-responsive means being connected to said first conduit between said restrictors and being connected to said second pressure point to be loaded in dependence upon the selected basic value, and means responsive to a speed condition of the low-pressure turbine connected to adjust the variable restrictor to vary said basic value in the sense to increase said rate of fuel flow on increase of said speed and to decrease said rate of fuel flow on decrease of said speed, thereby to control a speed condition of the low-pressure turbine in a desired manner.

2. A compound gas-turbine engine as claimed in claim 1, wherein said pressure fluid system comprises a second conduit, a first relief valve in said second conduit, selectively-adjustable means to load said first relief valve to determine the pressure in said second conduit at said relief valve, and a pair of restrictions in said second conduit downstream of said relief valve, said first pressure point being a point in said second conduit intermediate said pair of restrictions, and said second pressure point being in said second conduit downstream of said restrictions.

3. A compound gas-turbine engine as claimed in claim 2, wherein one of said pair of restrictions in said second conduit is fixed in effective area and the second is adjustable in accordance with the mass flow through the engine.

4. A compound gas-turbine engine as claimed in claim 3, wherein the speed-condition-responsive means comprises a member adapted to be driven at a rotational speed proportional to that of the low-pressure turbine and adapted to adjust the restriction of said variable restrictor in the first conduit in a sense to increase its restriction on increase of the rotational speed, and temperature-responsive means adapted to respond to the temperature in the intake of the low-pressure compressor of the engine and to adjust the variable restrictor in a sense to decrease the restriction of said variable restrictor on increase of the intake temperature.

5. A compound gas-turbine engine as claimed in claim 4, wherein the temperature-responsive means comprises a third conduit, a valve in said third conduit adjustable in accordance with the intake temperature, a second relief valve in said third conduit to control the pressure upstream of said adjustable valve, loading means to set the relief valve, and a pressure-responsive member connected to the variable restrictor in the first conduit and connected to be responsive to the pressure drop across said adjustable valve.

6. A compound gas-turbine engine as claimed in claim 5, wherein the selectively-adjustable means of said first relief valve and said loading means of said second relief valve are manually adjustable and are coupled together for simultaneous and similar operation.

7. A compound gas-turbine engine as claimed in claim 6, comprising also pressure-responsive nozzle-adjusting means connected to adjust the effective area of the jet nozzle and adapted to respond to a fluid pressure determined by one of said relief valves.

8. A compound gas turbine engine having a low-pressure compressor, a high-pressure compressor, main combustion equipment, a high-pressure turbine and a low pressure turbine disposed to receive the gas flow in series, the high-pressure turbine being drivingly connected to the high-pressure compressor and the low-pressure turbine being drivingly connected to the low-pressure compressor and rotatable independently of the high-pressure turbine, comprising reheat combustion equipment in series flow arrangement downstream of said low-pressure turbine, a variable-area jet nozzle in series flow arrangement downstream of said reheat combustion equipment, a reheat fuel injector in said reheat combustion equipment, a reheat fuel pump, a pipe connecting the delivery of said pump with said fuel injector, fluid-operated means to select the desired degree of reheat including means simultaneously to schedule a basic rate of fuel flow to said fuel injector and to adjust said variable-area jet nozzle in the sense that the scheduled fuel flow is increased on increase of area of said nozzle and is decreased on decrease of said area, said fluid-operated means comprising a source of fluid under pressure, first conduit means connected to said source, a variable-load relief valve connected to said conduit to regulate the pressure therein, the load being representative of the desired degree of reheat, second conduit means connected at its upstream end to said first conduit means, first pressure-responsive ram means connected to be responsive to a pressure in said second conduit means and connected to adjust the delivery of said reheat fuel pump to increase said delivery on increase of said pressure, and to decrease said delivery on decrease of said pressure, second pressure-responsive ram means connected to be responsive to a pressure in said first conduit means and connected to said variable-area nozzle to increase its area on increase of said pressure in said first conduit means, and to decrease its area on decrease of said pressure in said first conduit means, means responsive to the speed of the low-pressure turbine, and valve means in said second conduit means connected to said speed-responsive means and adapted to adjust the pressure therein to increase said pressure on increase of said speed and to decrease said pressure on decrease of said speed, thereby to increase said rate of fuel flow above said basic rate on increase of said speed and to decrease said rate of fuel flow below said basic rate on decrease of said speed, thereby to maintain the speed of the low-pressure turbine at a selected value.

References Cited in the file of this patent

UNITED STATES PATENTS

| | | |
|---|---|---|
| 2,529,973 | Sedille et al. | Nov. 14, 1950 |
| 2,617,361 | Neal | Nov. 11, 1952 |
| 2,641,324 | Fortescue | June 9, 1953 |
| 2,668,416 | Lee | Feb. 9, 1954 |
| 2,674,843 | Lombard | Apr. 13, 1954 |
| 2,683,349 | Lawrence | July 13, 1954 |
| 2,778,191 | Thompson | Jan. 22, 1957 |
| 2,820,340 | Dolza et al. | Jan. 21, 1958 |

FOREIGN PATENTS

| | | |
|---|---|---|
| 517,469 | Belgium | Feb. 28, 1953 |